United States Patent
Sauer

(10) Patent No.: US 8,335,096 B2
(45) Date of Patent: Dec. 18, 2012

(54) RECTIFIER LESS BIDIRECTIONAL AC TO DC CONVERTER

(76) Inventor: Don Roy Sauer, San Jose, CA (US)

( * ) Notice: Subject to any disclaimer, the term of this patent is extended or adjusted under 35 U.S.C. 154(b) by 272 days.

(21) Appl. No.: 12/945,704

(22) Filed: Nov. 12, 2010

(65) Prior Publication Data

US 2012/0120693 A1   May 17, 2012

(51) Int. Cl.
*H02M 7/217* (2006.01)
(52) U.S. Cl. .......... 363/89; 363/127
(58) Field of Classification Search ............ 363/76, 363/81, 84, 89, 125, 127
See application file for complete search history.

(56) References Cited

U.S. PATENT DOCUMENTS

| | | | |
|---|---|---|---|
| 4,811,191 A * | 3/1989 | Miller | 363/127 |
| 4,819,147 A * | 4/1989 | Bingham | 363/127 |
| 5,017,800 A | 5/1991 | Divan | |
| 5,019,952 A | 5/1991 | Smolenski | |
| 5,181,159 A | 1/1993 | Peterson | |
| 5,621,631 A | 4/1997 | Vinciarelli | |
| 5,652,700 A | 7/1997 | Tsai | |
| 6,067,243 A | 5/2000 | Suzuki | |
| 6,115,267 A | 9/2000 | Herbert | |
| 6,219,264 B1 * | 4/2001 | Drobnik | 363/127 |
| 6,282,109 B1 * | 8/2001 | Fraidlin et al. | 363/89 |
| 6,388,905 B2 | 5/2002 | Nakagawa | |
| 6,404,173 B1 | 6/2002 | Telefus | |
| 6,636,430 B1 | 10/2003 | Batarseh | |
| 6,850,426 B2 | 2/2005 | Kojori | |
| 7,102,251 B2 | 9/2006 | West | |
| 7,468,649 B2 * | 12/2008 | Chandrasekaran | 336/212 |
| 7,633,780 B2 * | 12/2009 | Endo et al. | 363/89 |
| 7,733,670 B2 | 6/2010 | Feng | |
| 7,786,709 B2 | 8/2010 | Lawson | |
| 7,859,868 B2 * | 12/2010 | Huang | 363/53 |
| 8,045,350 B2 * | 10/2011 | Sells | 363/81 |
| 2004/0062059 A1 | 4/2004 | Cheng | |
| 2007/0086222 A1 | 4/2007 | Iida | |
| 2007/0096595 A1 | 5/2007 | Larson | |
| 2007/0159858 A1 | 7/2007 | Spindler | |
| 2008/0094862 A1 | 4/2008 | Li | |

* cited by examiner

*Primary Examiner* — Gary L Laxton

(57) ABSTRACT

A split supply DC to DC converter is coupled through a low resistance path to a secondary coil of an ac line transformer, and is used as a high efficiency bidirectional AC to DC convertor. A small sense resistor is placed in series with the secondary in order to measure secondary current. The duty cycle of the DC to DC converter, which defines the voltage of what is normally treated as an output node, is modulated by the monitored secondary current. By coupling such an output node across the secondary coil, a voltage to current relationship is defined across the secondary to be that of a simulated resistor. Such a resistor will absorb power from the AC line and transfer it efficiently to the split supplies. The power transfer direction is reversed with the same efficiency by defining the current to voltage relationship to be one of a negative resistor.

12 Claims, 4 Drawing Sheets

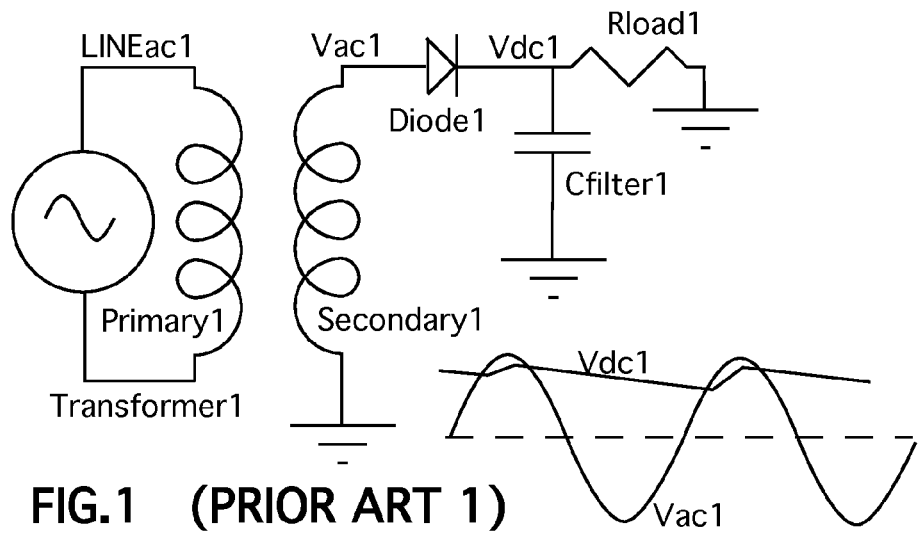
FIG. 1 (PRIOR ART 1)
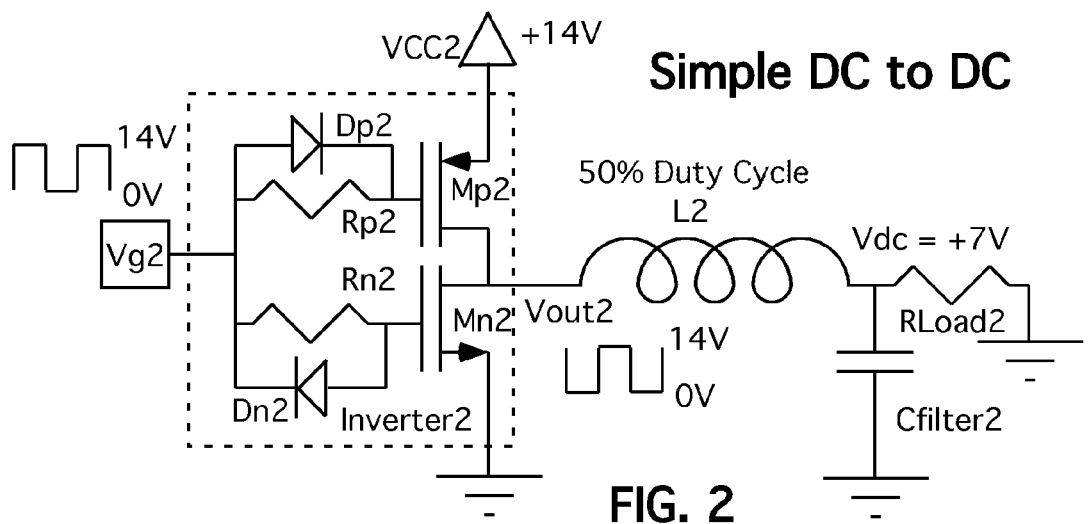
FIG. 2

RECTIFIER LESS BIDIRECTIONAL AC TO DC CONVERTER

FIELD OF THE INVENTION

This invention relates to the bidirectional transfer of power between an AC power source and two DC powers sources. The circuit consists of a simple DC to DC convertor which is using split supplies, and has a node that is normally an output node coupled through a low resistance path to the secondary of a AC line power transformer. Current in the secondary is monitored by adding a small series sense resistor. Having the change in duty cycle of the DC to DC convertor be scaled to the secondary current results in the secondary coil seeing a simulated resistor across it. The simulated resistor will absorb power, and will transfer it at high efficiency to the split supplies. Simulating a negative resistor will reverse the power flow direction. The current to voltage relationship that appears across the secondary coil is completely flexible in terms of magnitude, phase, linearity, symmetry, and even polarity.

BACKGROUND

With the development of smart power meters, it will now be possible for power companies to charge consumers at different rates during the day. They are also now pushing for AC to DC convertors to have a high power factor. A perfect power factor is that of a resistor. Using an efficient bidirectional power converter could start making economical sense if the power companies begin charging a high enough rate difference over the day. It might some day make economic sense to store energy in batteries at home during low rates, and then convert the energy back to AC during high rates. And the battery energy gets transferred to the AC line as a high power factor negative resistor, not as an AC inverter. Not very many bidirectional AC to DC converters work with a perfect power factor and without the use of diodes as rectifiers. And at low AC voltages, diode rectifiers cut into power efficiency.

BRIEF SUMMARY OF THE INVENTION

This invention applies a simple split supply DC to DC converter to an AC to DC converter application. Secondary AC currents and voltages are monitored and used to define the duty cycle in order to load the AC line with a simulated resistor. The simulated resistor is fully adjustable in terms of phase, magnitude, linearity, symmetry or even polarity. A simulated resistor will absorb energy and transfer it at high efficiency to the split supplies. A negative simulated resistor will transfer energy from the split supplies to the AC line with the same efficiency and power factor. The current to voltage relationship that loads the AC line is completely equation definable.

BRIEF DESCRIPTION OF THE DRAWINGS

Non-limiting and non-exhaustive embodiments are described with reference to the following drawings:

FIG. 1 illustrates a prior art AC to DC convertor using a single diode to rectify an AC voltage into a DC voltage.

FIG. 2 illustrates a simple DC to DC converter which is running at a duty cycle of 50 percent.

DETAILED DESCRIPTION OF THE PREFERRED EMBODIMENT

Figure 3:
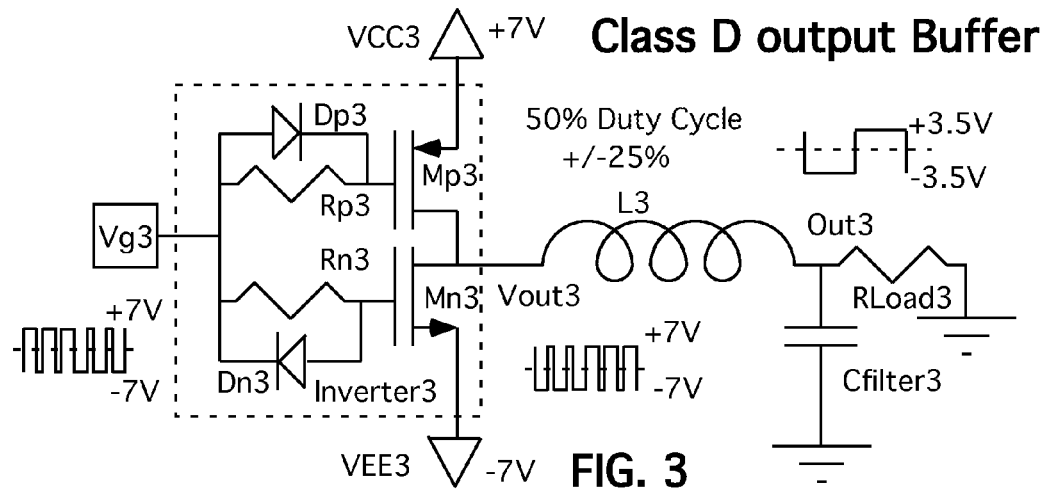
FIG. 3 illustrates a dual supply DC to DC convertor producing a Class D AC output by varying the duty cycle above and below 50 percent.

FIG. 1 shows a simple AC to DC converter that is using Diode1 to rectify the AC line voltage LINEac1 into a DC voltage Vdc1. Power is being transferred only during the time when the voltage on the AC line is at a peak value. Having current flow only during a short period of time tends to reduce the efficiency by which the AC lines can economically deliver power. The ideal loading of an AC line is that of a resistor. Having current flow like a resistor corresponds to a Power Factor Loading of One. The power utilities companies are beginning to push for a high power factor requirement in the home environment.

Most AC to DC conversion methods that improve the power factor use diodes as normal full wave rectifiers. Sometime the diodes get replaced with switches to do some synchronous rectification. Some of the methods provide the bidirectional transfer of power from AC to DC and from DC to AC. This invention can transfer power like a perfect resistor in either direction. It can do so with the efficiency of a DC to DC converter because it is just using a DC to DC converter in a new way.

FIG. 2 shows a simple DC to DC converter where the power PMOS transistor Mp2 and the power NMOS transistor Mn2 are being modeled as a perfect CMOS inverter inside the inverter block Inverter2. In practice, the two CMOS transistors are so large that steps need to be taken to prevent both transistors from being on at the same time. The diodes Dp2 and Dn2 and the resistors Rp2 and Rn2 are being used symbolize the fact that the turning off of a transistor should be faster than the turning on. Outside of taking steps to avoid shoot through current, the transistors of Inverter2 are mainly being used as a CMOS inverter.

Modeling Inverter2 as a perfect CMOS inverter. When a transistor is on, it operates like a short. And when a transistor is off, it operates like an open. If the transistors were perfect, they would have no stray capacitance. They would switch instantaneously, and would draw very little power. In practice, the charging and discharging of capacitors does dissipate power. This can be thought of as applying a switch capacitor resistor across the two supplies. The output of Inverter2 drives inductor L2, which is connected to capacitor Cfilter2 and load resistor RLoad2. The LCR network can be thought as a perfect two pole low pass filter. When the pulse width modulated output Vout2 is seeing a 50% duty cycle, the voltage across RLoad2 should be half the VCC2.

The output of inverter2 causes inductor L2 to gets shorted between VCC2 and ground. Inductors cannot change their current instantaneously, and the L2 will be ramping up and down its current based upon the size of the inductor and the voltage across it. If the ON resistances for Mp2 and Mn2 are both low, neither NMOS power transistors draw much power. The inductor L2 and capacitor Cfilter2 should ideally draw little power. So it in common to see a power transfer efficiency from VCC2 to the load resistor RLoad2 that ranges between 90% to 100%.

A class D audio amplifier is mainly just a DC to DC converter which produces an AC output. FIG. 3 shows what could be used in a split supply applications to enable op amps to drive low impedance loads. To swing the voltage across load resistor RLoad3, the duty cycle applied the inverter block Inverter3, needs to vary above and below 50%.

Figure 4:
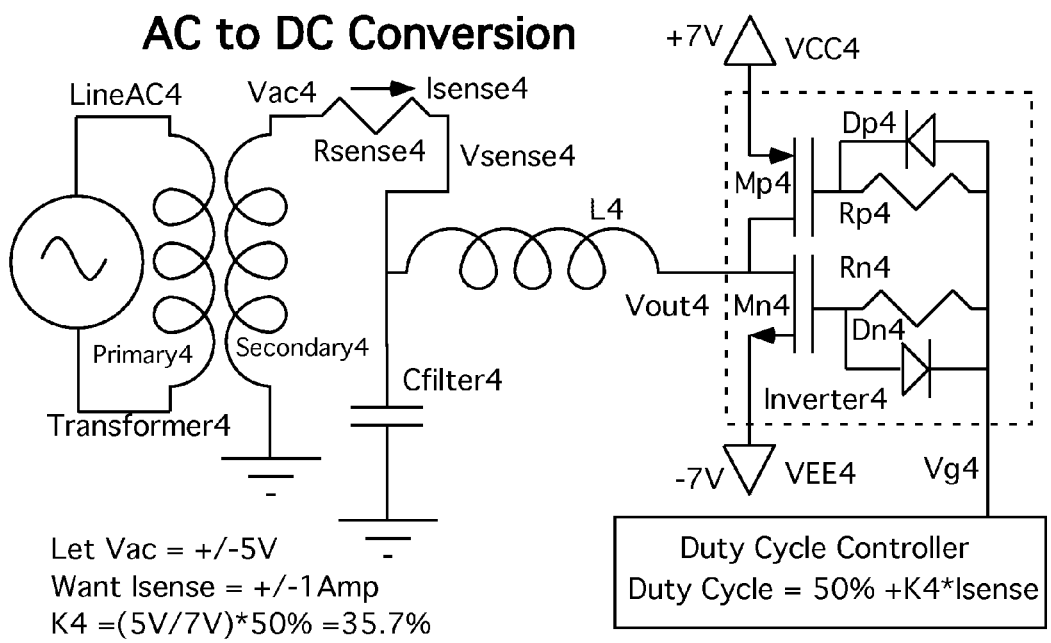
FIG. 4 illustrates the invention in which the circuit of FIG. 3 has its output node Out3 coupled through a low resistance current sense resistor to a secondary coil of a transformer, and the current being sensed is modulating the duty cycle such that the secondary is seeing a simulated resistor, and the simulated resistor is absorbing energy and efficiently it to the dual supplies.

FIG. 4 show that the invention is really just using a DC to DC converter hooked up differently. Four different things are happening compared to the circuit of FIG. 3. And there are eight surprising results.

First, the load resistor is now being used as a low resistance current sense resistor which get placed in series with an AC line transformer's secondary coil, and is used to measure secondary current. FIG. 4 shows one side of the secondary at ground and the other side having the sense resistor.

Second, the normal output port Out3 of FIG. 3 is now being used as a bidirectional input port. The output node Out3 is now being called Vsense4. And Vsense4 is now essentially being couple almost directly across the secondary coil.

Third, the secondary current is now being monitored, and it is being used to modulate the duty cycle of Inverter4. The duty cycle of inverter4 defines the voltage at the Vsense4 node. So the current to voltage relationship that is taking place at Vsense4 is being defined to be that of a simulated resistor. Input current Isense4 is set to produce a proportional value for Vsense4.

Fourth, this simulated resistor will absorb energy just like a real resister. But unlike a real resistor, the absorbed energy does not get converted to heat. Both transistors in Inverter4 draw very little power when they are either on or off. And inductors and capacitors draw little power. Laws of physics states that energy can neither be destroyed nor created. So the only place the absorbed energy can go is to the dual supplies.

Consider an example where the secondary is swinging +/−5V and one wishes the secondary current to swing by +/−1 amp. Because the supplies are +/−7V, the duty cycle for inverter4 needs to be 50% +/−35.7% in order for Vsense4 to swing +/−5V. Since the wish is that +/−1 Amp produces such voltages, K4 when set to equal 35.7% will produce the desired 5 Ohm simulated resistor.

The first surprise to this invention is that modulating the duty cycle is what is causing the power to be transferred to the DC supplies. With Vac4 at 5 Volts, 1 Amp is flowing for Isense4. So the input absorbed power is 5 watts. The duty cycle will be 85.71% when Vsen4 is 5 Volts. Inverter4 will be multiplexing the 1 Amp current in inductor L4 between the two split supplies. If VCC4 were a battery, it is being pumped up with 857 mA, which works out to being charge up by 6.0 watts. If VEE4 were a battery, it is being drained by 142.8 mA, which is discharged by 1 watt. If the IR drop in the signal path is low, then the split supplies batteries are being charged up at that moment by a net total of about 5 Watts.

The same thing happens when Vac4 is at −5Volts. Now the duty cycle is at 14.31%, and the 1 Amp of current is in the opposite direction. Now VEE4 is being charged and VCC4 discharged. Notice that the dual supplies alternate between being charged and discharged. But over one complete cycle, each supply is receiving half the power that a 5 Ohm resistor would normally dissipate as heat.

The second surprise is the power factor. The invention in it's simplest form has a perfect power factor of one. The AC line thinks its seeing just a resistor across it. But the current to voltage relationship is being completely defined by how one chooses to define the duty cycle. An equation can defined the current to voltage relationship to be pretty much anything.

Figure 5:
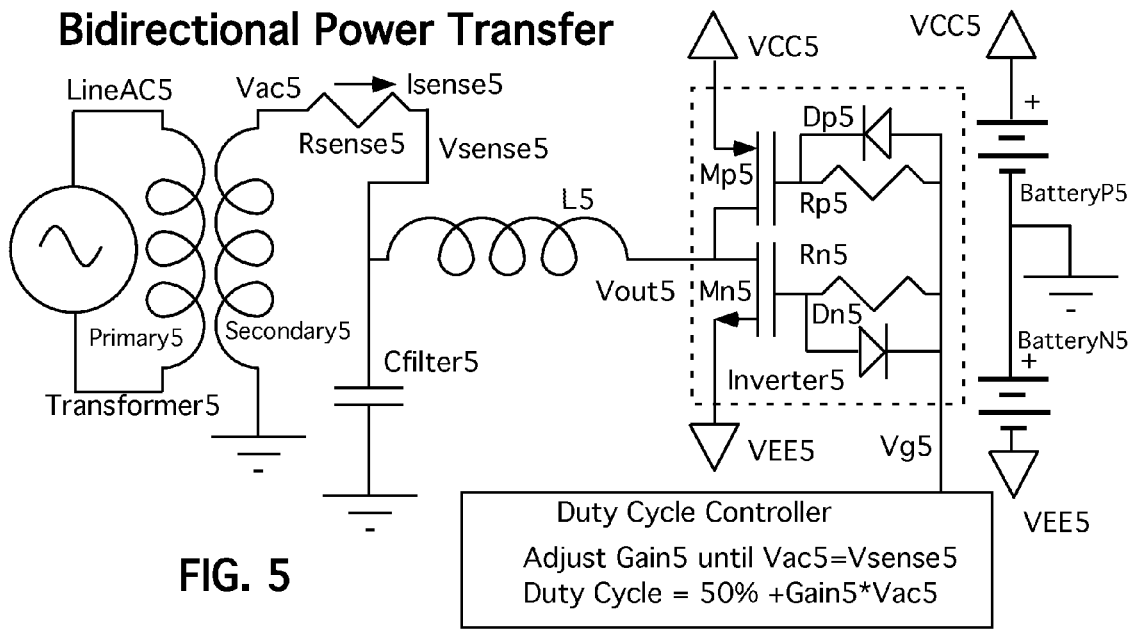
FIG. 5 illustrates how the duty cycle can be controlled to provide a high efficiency bidirectional power flow between the secondary and the dual supplies.

The third surprise of the invention is how easy it is to transfer power bidirectionally. In FIG. 5, start off by adjusting a gain value Gain5 until the AC voltage Vsense5 is exactly equal to Vac5. In this example, the duty cycle will now get modulated by Gain5 time the measured Vac5 input voltage. Using the values from FIG. 4, Gain5 should equal K4/5 or (35.7%/5).

So when Gain5 is at the right value, Isense5 is zero. Now decrease the value of Gain5, and now both current and power will be flowing from the secondary to the split supplies. Now increase the value of Gain5, and the power flow reverses direction. Unlike an AC inverter, the DC to AC power transfer is taking place as though a negative resistor has been connected across the AC line. The method shown in FIG. 5 is a convenient way for switching between power directions, since the power flow goes to that of an open circuit in-between directions.

Figure 6:
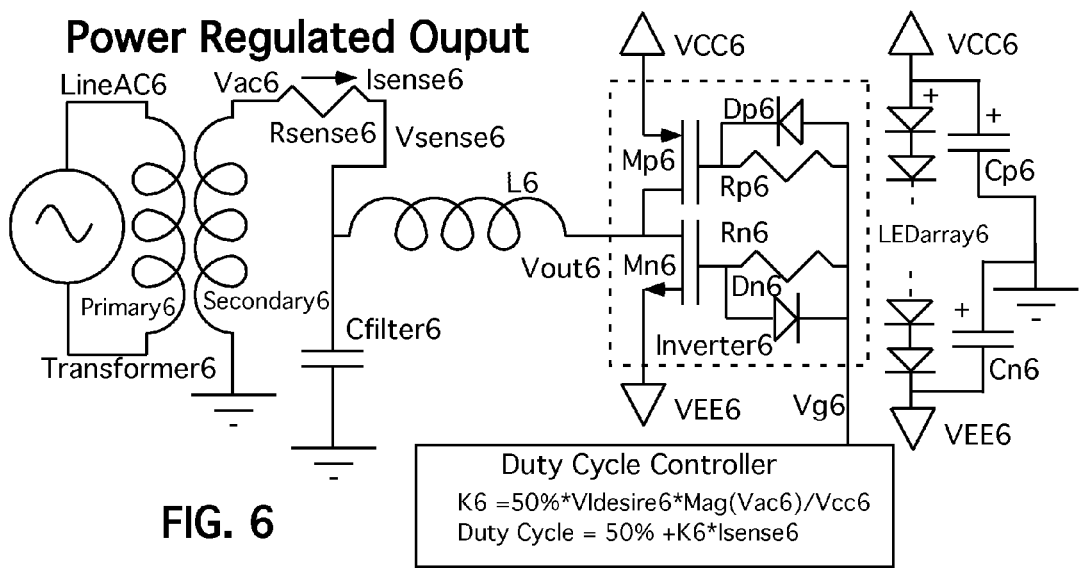
FIG. 6 illustrates how the power flow from the secondary to the dual supplies can be regulated to be at a constant power level.

FIG. 6 shows a fourth surprise to this invention. The output power wants to naturally come out as being power regulated. Take an example where the output load is something like an array of LEDS. LEDS have a sizable temperature coefficient to their current to voltage relationship. While normally LEDS tend to be driven with current regulated sources, this invention provides a constant output power drive option instead.

Normally all the AC and DC voltages should be monitored and included inside the duty cycle equation. FIG. 6 is treating VCC6 to equal in magnitude VEE6 in order to simplify the equations. The example shown for FIG. 4 is defining the desirable voltage to current relationship to have a peak input AC voltage of 5 volts result in a peak 1 Amp input current. Making FIG. 6 to be essentially the same as FIG. 4 will set the VIdesire6 term set to one and K6 is also 35.7%. Consider in FIG. 6 when both VCC6 and VEE6 increase by 10%. This will cause the K6 term to decrease by 10% to now being 32.5%. So while having supply voltages 10% higher will try to make Vsense6 about 10% higher, the 10% reduction in K6 will keep Vsense6 the same. So the simulated input load resistor is supply independent, and so is the absorbed power. The very same 10% reduction in K6 values reduces the magnitude of the +/− duty cycle, which in turn reduces the imbalance of current flowing to VCC6 and VEE6. So when the split supplies increase in voltage, the current to them decreases by the same amount to hold the power transfer constant.

Figure 7:
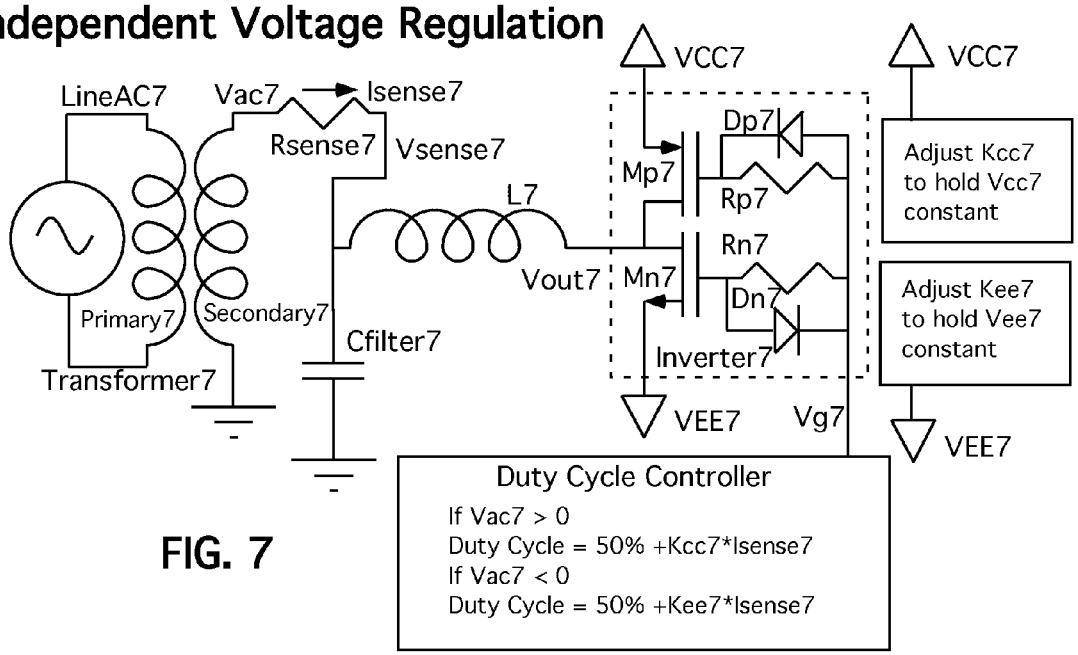
FIG. 7 illustrates how both supply voltages of the dual supply can be independently regulated.

Several surprises have come out of FIG. 7. Most AC to DC converters provide a voltage regulated output. Now if the load on supplies VCC7 and VEE7 are only capacitors, the two supply capacitors would both ramp up their voltages until something breaks down. Since both supplies should be monitored anyway, there is nothing stopping the duty cycle equation from including such data in a way that the value that defines the input simulated resistance is variable depending on the current loading.

The fifth surprise was how easy it is to make the input voltage to current relationship both variable over many orders of magnitude, and also asymmetrical, so that VCC7 can be regulated independently from VEE7. For instance the current load on VEE7 can be made light, and the loading on VCC7 can be made to jump around several orders of magnitude. The only noticeable affect is that a heavy loading on VCC7 will cause ripple on both VCC7 and VEE7.

This is where the sixth surprise comes in. Because VCC7 and VEE7 are alternatively being charged and discharged for every cycle, it is not possible to have a completely asymmetrical current loading on the secondary coil. When every VCC7 gets charged, VEE7 gets discharge by a lesser amount. And that discharge needs to be recovered during the next half cycle. That is why a large load on VCC7 will produce some ripple on VEE7. The asymmetrical loading appears to be limited to about a two to one ratio. So the loading of the AC line cannot get as symmetrical as it is in FIG. 1, even when VCC6 is being used, and VEE6 is not being loaded.

The seventh surprise is that VCC7 and VEE7 need not be the same magnitude. When one knows what both VCC7 and VEE7 are, it does not take much algebra to rewrite the duty cycle equations to compensate. In fact, the duty cycle can be rewritten to compensate for moving supply voltages provided the supply voltages are being monitored.

The only limitation to the split supply values is that the incoming input AC needs to be smaller than the dual supplies, otherwise the drain bulk diodes of the power MOS transistors get forward biased. That is what is the eight surprise. The bulk drain diodes will charge up capacitors on both supplies to self start up the circuit enough to start up the duty cycle circuitry, which will take it from there. So the invention has a built in auto startup feature.

Figure 8:
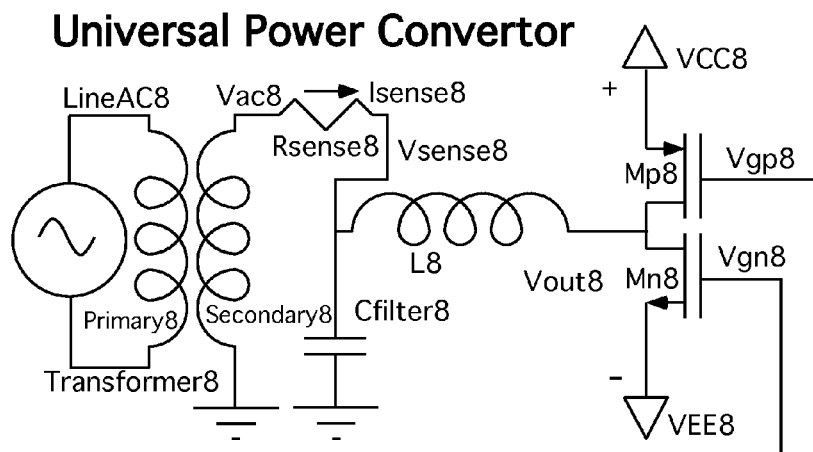
FIG. 8 illustrates how a micro-controller having several analog inputs, can monitor several voltages and currents, and calculate the duty cycle in software, and provide the two low shoot through current gate drives for the output power MOS transistors.

FIG. 8 shows the invention consists mainly of just using a DC to DC converter in a different way. The inductor, capacitor, and two output power MOS transistors are really all just the same. The difference consists of using what is normally an output to instead be used as a bidirectional input. And how the duty cycle gets defined is significantly different as well.

Since the current to voltage loading of the AC line can now be user defined, there are not a lot of limitations as to what can be done. The AC line need not be loaded with just a real or negative resistor. The loading can be made to be that of an inductor or a capacitor. And there is no limitation on how distorted the voltage to current relationship can be defined. While full wave rectifiers are constrained to load the AC line at peak voltage levels, the duty cycle equation for this invention can be made to conduct power during the time when a full wave rectifier is not loading the AC line.

What this invention requires over and above a normal DC to DC convertor it the capacity to measure several voltages and currents, and then stick them into an equation to define the duty cycle. Many micro-controllers have several analog inputs. In theory, the equations could all be done in such a micro-controller using assembly code. But the hardware that will be used will be just the same standard DC to DC convertor hardware.

While the invention has been shown in this particular embodiment, it will be understood by those skilled in the art, that different types of AC power sources, and different methods for DC to DC conversion, and different methods of sensing current, and different equations to adjust duty cycle, can be substituted, as long as the end result generates a voltage to current relationship that can be used to transfer power to and from an AC source to two DC sources. All of these substitutions can all be made with out departing from the spirit and scope of the invention.

What is claimed is:

1. A rectifier less ac to dc converter comprising:
an ac power source having an ac input node and a ground node; and
a small resistance value sense resistor coupled between the said ac input node and a voltage sense node; and
a high frequency current bypass capacitor is coupled between said voltage sense node and the said ground node; and
a power inductor is connected between said voltage sense node and a switching output node; and
a power pmos transistor having a pmos source is connected to a positive vcc voltage node, and having a pmos drain is connected to the said switching output node, and having a pmos gate node; and
a power nmos transistor having a nmos source is connected to a negative vee voltage node, and having a nmos drain is connected to the said switching output node, and having a nmos gate node; and
a pulse width modulation generation circuit couples a pair of low supply current shoot through gate voltage switching signals to the said pmos gate node and the said nmos gate node ; and
the said pulse width modulation generation circuit has an effective duty cycle which defines the voltage at the said voltage sense node; and
an input current measuring means is connected across the said small resistance value sense resistor; and
said input current measuring means adjusts the said effective duty cycle of the said pulse width modulation generation circuit; such that
a secondary ac output coil sees an equivalent load impedance connected across it which has a current to voltage relationship to be that of an equivalent simulated resistor; and
an efficient power transfer takes place between the said secondary ac output coil, into the said equivalent simulated resistor, and on to both equally the said positive vcc voltage node and the said negative vee voltage node.

2. A rectifier less ac to dc converter comprising:
an ac line transformer having a primary ac input coil and a secondary ac output coil; and
a small resistance value sense resistor connected in series with the said secondary ac output coil; and
a first secondary coil node of the said secondary ac output coil is coupled through a first low resistance path to a ground node, and a second secondary coil node of said secondary ac output coil is coupled through a second low resistance path to a voltage sense node; and
a high frequency current bypass capacitor is coupled between said voltage sense node and the said ground node; and
a power inductor is connected between said voltage sense node and a switching output node; and
a power pmos transistor having a pmos source is connected to a positive vcc voltage node, and having a pmos drain is connected to the said switching output node, and having a pmos gate node; and
a power nmos transistor having a nmos source is connected to a negative vee voltage node, and having a nmos drain is connected to the said switching output node, and having a nmos gate node; and
a pulse width modulation generation circuit couples a pair of low supply current shoot through gate voltage switching signals to the said pmos gate node and the said nmos gate node; and
the said pulse width modulation generation circuit has an effective duty cycle which defines the voltage at the said voltage sense node; and
an input current measuring means is connected across the said small resistance value sense resistor; and the said input current measuring means adjusts the said effective duty cycle of the said pulse width modulation generation circuit; such that the said secondary ac output coil sees an equivalent load impedance connected across it which has a current to voltage relationship to be that of an equivalent simulated resistor; and an efficient power transfer takes place between the said secondary ac output coil, into the said equivalent simulated resistor, and on to both equally the said positive vcc voltage node and the said negative vee voltage node.

3. A rectifier less bidirectional ac to dc converter comprising:

an ac line transformer having a primary ac input coil and a secondary ac output coil; and a small resistance value sense resistor connected in series with the said secondary ac output coil; and a first secondary coil node of the said secondary ac output coil is coupled through a first low resistance path to a ground node, and a second secondary coil node of said secondary ac output coil is coupled through a second low resistance path to a voltage sense node; and a high frequency current bypass capacitor is coupled between said voltage sense node and the said ground node; and a power inductor is connected between said voltage sense node and a switching output node; and a power pmos transistor having a pmos source is connected to a positive vcc voltage node, and having a pmos drain is connected to the said switching output node, and having a pmos gate node; and a power nmos transistor having a nmos source is connected to a negative vee voltage node, and having a nmos drain is connected to the said switching output node, and having a nmos gate node; and a pulse width modulation generation circuit couples a pair of low supply current shoot through gate voltage switching signals to the said pmos gate node and the said nmos gate node; and the said pulse width modulation generation circuit has an effective duty cycle which defines the voltage at the said voltage sense node; and an input current measuring means is connected across the said small resistance value sense resistor, and a secondary coil voltage measuring means is connected across secondary ac output coil; and the said effective duty cycle of the said pulse width modulation generation circuit is adjusted by the product of a measured input voltage of said secondary voltage measuring means times an adjustable gain level; such that a reference magnitude of the said adjustable gain level causes the to said voltage sense node and the said secondary ac output coil to have equal ac voltage; and a decrease in magnitude of the said adjustable reference gain level below the said reference magnitude results in the transfer of power from said secondary ac output coil to the said positive vcc voltage node and the said negative vee voltage node; and an increase in magnitude of the said adjustable reference gain level above the said reference magnitude results in the transfer of power from the said positive vcc voltage node to the said secondary ac output coil.

4. A rectifier less ac to dc converter of claim 1, wherein there is an addition of a power regulated output power transfer mode comprising:

a supply voltage measuring means is connected to the said positive vcc voltage node and the said negative vee voltage node; and the said input current measuring means additionally adjusts the said effective duty cycle of the said pulse width modulation generation circuit to an inverse scale of a measured value supply of the said supply voltage measuring means; such that a power regulated power transfer takes place between the said secondary ac output coil, and into the said equivalent resistor, and on to the said positive vcc voltage node and the said negative vee voltage node.

5. A rectifier less ac to dc converter of claim 1, wherein there is an addition of a independent dual output voltage regulated power transfer mode comprising:

a dual supply voltage measuring means is connected to the said positive vcc voltage node and the said negative vee voltage node; and the said input current measuring means independently adjusts the said effective duty cycle of the said pulse width modulation generation circuit to two separate half cycle voltage adjustment scales derived from of a set of measured supply values of the said dual supply voltage measuring means; such that an independent dual voltage regulated power transfer takes place between the said secondary ac output coil, into an asymmetrically simulated resistor, and asymmetrically on to the said positive vcc voltage node and the said negative vee voltage node.

6. A rectifier less ac to dc converter of claim 1, wherein there is an addition of a externally modifiable power transfer mode comprising:

an external voltage measuring means is connected to an external input port; and the said input current measuring means to adjust the said effective duty cycle of the said pulse width modulation generation circuit is additionally modifiable by the said external voltage measuring means: such that an externally modifiable power transfer takes place between the said secondary ac output coil, into an asymmetrically simulated resistor, and asymmetrically on to the said positive vcc voltage node and the said negative vee voltage node.

7. A rectifier less ac to dc converter of claim 1, wherein there is an addition of a equation modifiable power transfer mode comprising:

the said input current measuring means to adjust the said effective duty cycle of the said pulse width modulation generation circuit is modifiable by the application of an internal duty cycle equation: such that an internal duty cycle equation defines a style of power transfer that takes place between the said secondary ac output coil, into an equation defined simulated resistor, and on to the said positive vcc voltage node and the said negative vee voltage node.

8. A rectifier less ac to dc converter of claim 2, wherein there is an addition of a power regulated output power transfer mode comprising:

a supply voltage measuring means is connected to the said positive vcc voltage node and the said negative vee voltage node; and the said input current measuring means additionally adjusts the said effective duty cycle of the said pulse width modulation generation circuit to an inverse scale of a measured value supply of the said supply voltage measuring means; such that a power regulated power transfer takes place between the said secondary ac output coil, and into the said equivalent resistor, and on to the said positive vcc voltage node and the said negative vee voltage node.

9. A rectifier less ac to dc converter of claim 2, wherein there is an addition of a independent dual output voltage regulated power transfer mode comprising:

a dual supply voltage measuring means is connected to the said positive vcc voltage node and the said negative vee voltage node; and the said input current measuring means independently adjusts the said effective duty cycle of the said pulse width modulation generation circuit to two separate half cycle voltage adjustment scales derived from of a set of measured supply values of the said dual supply voltage measuring means; such that an independent dual voltage regulated power transfer takes place between the said secondary ac output coil, into an asymmetrically simulated resistor, and asymmetrically on to the said positive vcc voltage node and the said negative vee voltage node.

10. A rectifier less ac to dc converter of claim 2, wherein there is an addition of a externally modifiable power transfer mode comprising:

an external voltage measuring means is connected to an external input port; and the said input current measuring means to adjust the said effective duty cycle of the said pulse width modulation generation circuit is additionally modifiable by the said external voltage measuring means: such that an externally modifiable power transfer takes place between the said secondary ac output coil, into an asymmetrically simulated resistor, and asymmetrically on to the said positive vcc voltage node and the said negative vee voltage node.

11. A rectifier less ac to dc converter of claim 2, wherein there is an addition of a equation modifiable power transfer mode comprising:

the said input current measuring means to adjust the said effective duty cycle of the said pulse width modulation generation circuit is modifiable by the application of an internal duty cycle equation: such that an internal duty cycle equation defines a style of power transfer that takes place between the said secondary ac output coil, into an equation defined simulated resistor, and on to the said positive vcc voltage node and the said negative vee voltage node.

12. A rectifier less bidirectional ac to dc converter of claim 3, wherein there is an addition of a equation modifiable power transfer mode comprising:

the said input current measuring means to adjust the said effective duty cycle of the said pulse width modulation generation circuit is modifiable by the application of an internal duty cycle equation: such that an internal duty cycle equation defines a style of bidirectional power transfer that takes place between the said secondary ac output coil, into an equation defined simulated resistor, and on to the said positive vcc voltage node and the said negative vee voltage node.

\* \* \* \* \*